US010296359B2

(12) United States Patent
Whiteford et al.

(10) Patent No.: US 10,296,359 B2
(45) Date of Patent: May 21, 2019

(54) INTERACTIVE SYSTEM CONTROL APPARATUS AND METHOD

(71) Applicant: BAE Systems plc, London (GB)

(72) Inventors: Christopher James Whiteford, Warton (GB); Nicholas Giacomo Robert Colosimo, Warton (GB); Julian David Wright, Warton (GB)

(73) Assignee: BAE SYSTEMS PLC, London (GB)

( * ) Notice: Subject to any disclaimer, the term of this patent is extended or adjusted under 35 U.S.C. 154(b) by 12 days.

(21) Appl. No.: 15/551,085

(22) PCT Filed: Feb. 15, 2016

(86) PCT No.: PCT/GB2016/050362
§ 371 (c)(1),
(2) Date: Aug. 15, 2017

(87) PCT Pub. No.: WO2016/135446
PCT Pub. Date: Sep. 1, 2016

(65) Prior Publication Data
US 2018/0032139 A1    Feb. 1, 2018

(30) Foreign Application Priority Data

Feb. 25, 2015    (EP) ..................................... 15275049
Feb. 25, 2015    (GB) .................................. 1503116.4

(51) Int. Cl.
*G06F 3/01*    (2006.01)
*G06K 9/00*    (2006.01)
(Continued)

(52) U.S. Cl.
CPC ........... *G06F 9/451* (2018.02); *G05B 19/048* (2013.01); *G06F 3/011* (2013.01); *G06F 3/013* (2013.01);
(Continued)

(58) Field of Classification Search
CPC .... G06F 9/451; G06F 3/04815; G06F 3/0481; G06F 3/017; G06F 3/013; G06F 3/011;
(Continued)

(56) References Cited

U.S. PATENT DOCUMENTS 6,037,882 A  *  3/2000  Levy ....................... G06F 3/011
                                                             340/11.1
6,094,625 A        7/2000  Ralston
(Continued)

FOREIGN PATENT DOCUMENTS

EP            0679984 A1    11/1995
EP            2405349 A1     1/2012
(Continued)

OTHER PUBLICATIONS

PCT International Search Report and Written Opinion for Appl No. PCT/GB2016/050362 dated Mar. 9, 2016, 9 pages.
(Continued)

*Primary Examiner* — Mihir K Rayan
(74) *Attorney, Agent, or Firm* — Maine Cernota & Rardin

(57) ABSTRACT

A mixed reality control apparatus for a system having at least one remote data source requiring at least one physical control input, the apparatus comprising a headset for placing over a user's eyes, in use, the headset including a screen, the apparatus further including a processor configured to receive data from the at least one remote data source and display the data on the screen within a three-dimensional virtual environment, and image capture means for capturing images of the real world environment in the vicinity of the user, the processor being further configured to: blend at least portions or objects of the images of the real world environment into the three-dimensional virtual environment to create a mixed reality environment, including the data, to be displayed on the screen; and generate a virtual representation of the at
(Continued)

least one physical control input and blend the virtual representation into the mixed reality environment at a selected location, and generate a marker representative of the selected location; wherein the apparatus is configured to receive a user input in association with the marker, identify the user input as an action in respect of the control input, or the virtual representation thereof, and generate a control signal to effect the action accordingly.

10 Claims, 2 Drawing Sheets

(51) Int. Cl.
| | |
|---|---|
| G06T 7/55 | (2017.01) |
| G06T 7/73 | (2017.01) |
| G09G 3/00 | (2006.01) |
| G06F 9/451 | (2018.01) |
| G06T 19/00 | (2011.01) |
| H04N 5/225 | (2006.01) |
| H04N 5/247 | (2006.01) |
| G06F 3/0481 | (2013.01) |
| G05B 19/048 | (2006.01) |

(52) U.S. Cl.
CPC ............ *G06F 3/017* (2013.01); *G06F 3/0481* (2013.01); *G06F 3/04815* (2013.01); *G06T 19/006* (2013.01); *G09G 3/003* (2013.01); *G05B 2219/40131* (2013.01); *G06K 9/00355* (2013.01); *G06T 7/55* (2017.01); *G06T 7/73* (2017.01); *H04N 5/2253* (2013.01); *H04N 5/247* (2013.01)

(58) Field of Classification Search
CPC ........ G05B 19/048; G05B 2219/40131; G09G 3/003; G11B 27/00; G06T 19/006; G06T 7/55; G06T 7/73; H04N 5/2253; H04N 5/247; G09K 9/00355
See application file for complete search history.

(56) References Cited

U.S. PATENT DOCUMENTS

| | | | | |
|---|---|---|---|---|
| 6,292,158 | B1 * | 9/2001 | Amafuji | G02B 27/017 |
| | | | | 345/672 |
| 6,600,480 | B2 * | 7/2003 | Natoli | G06F 3/014 |
| | | | | 345/156 |
| 8,217,856 | B1 * | 7/2012 | Petrou | G02B 27/017 |
| | | | | 345/8 |
| 9,046,685 | B2 * | 6/2015 | Nakada | G02B 27/017 |
| 10,048,779 | B2 * | 8/2018 | Thomas | G06F 3/03547 |
| 2004/0095311 | A1 | 5/2004 | Tarlton et al. | |
| 2010/0110069 | A1 * | 5/2010 | Yuan | G06T 15/20 |
| | | | | 345/419 |
| 2010/0156787 | A1 | 6/2010 | Katayama | |
| 2012/0206452 | A1 * | 8/2012 | Geisner | G02B 27/017 |
| | | | | 345/419 |
| 2012/0290401 | A1 * | 11/2012 | Neven | A61B 3/113 |
| | | | | 705/14.68 |
| 2013/0257899 | A1 * | 10/2013 | Baron | G06T 19/006 |
| | | | | 345/619 |
| 2014/0336876 | A1 | 11/2014 | Gieseke et al. | |
| 2014/0368533 | A1 | 12/2014 | Salter | |
| 2017/0061696 | A1 * | 3/2017 | Li | G06T 7/70 |
| 2017/0249019 | A1 * | 8/2017 | Sawyer | G02B 27/017 |
| 2017/0316613 | A1 * | 11/2017 | Wright | G06F 3/011 |
| 2018/0218631 | A1 * | 8/2018 | Wright | G06F 3/011 |

FOREIGN PATENT DOCUMENTS

| | | |
|---|---|---|
| JP | 2009169622 A | 7/2009 |
| WO | 2010073928 A1 | 7/2010 |

OTHER PUBLICATIONS

European Extended Search Report for Appl No. 15275049.3 dated Jul. 3, 2015, 7 pages.
Great Britain Search Report for Appl No. GB1503116.4 dated Aug. 11, 2015, 4 pages.
International Preliminary Report on Patentabililty of International Application No. PCT/GB2016/050362, dated Aug. 29, 2017, 8 pages.

\* cited by examiner

INTERACTIVE SYSTEM CONTROL APPARATUS AND METHOD

RELATED APPLICATIONS

This application is a national phase application filed under 35 USC § 371 of PCT Application No. PCT/GB2016/050362 with an International filing date of Feb. 15, 2016, which claims priority of GB Patent Application 1503116.4 filed Feb. 25, 2015 and EP Patent Application 15275049.3 filed Feb. 25, 2015. Each of these applications is herein incorporated by reference in its entirety for all purposes.

FIELD OF THE INVENTION

This invention relates generally to a system control apparatus and method for facilitating user control and/or operations of a system.

BACKGROUND OF THE INVENTION

Many complex systems rely on highly specialised components in order to achieve their functionality or perform a particular role, and information tends to be handled using a combinations of physical hardware and graphics represented on a two-dimensional screen. Generally, the user interacts with such information provided on-screen using a mouse or touchscreen input method, whereas specific/specialised tasks tend to be effected through the use of bespoke switch panels, dials, buttons, slide controls, and the like. The result is a complex physical control environment, which places a relatively high workload and training burden on individuals, and increases the potential for human error during interaction.

Technological advances have addressed this issue to a limited extent, by, for example, the integration of LCDs into a single control element, thereby allowing the control element to perform multiple functions. Advances in touch screen and alternative technologies, such as voice commands and gaze recognition, have also attempted to alleviate some of the problems identified above. However, such technologies have severe limitations, particularly in relation to the types of control elements they can be used to replace or enhance, and the user is still, in any event, provided with a system with which they are required to interact in a 'conventional' manner, i.e. as if the physical controls were still present and in the same relative locations as in a system comprised entirely of physical controls. Thus, the user is still constrained, to a large extent, by conventional methods of interacting with the system, with the result that the above-mentioned disadvantages are still present.

It would, therefore, be desirable to provide a method and apparatus for controlling the functions and/or operations of a system which at least addresses some of the problems outlined above.

Virtual reality systems are known, comprising a headset which, when placed over a user's eyes, creates and displays a three-dimensional virtual environment in which a user feels immersed and with which a user can interact in a manner dependent on the application. For example, in some prior art systems, the virtual environment created may comprise a game zone, within which a user can play a game. However, in an environment where the user needs to be able to see where they are going in order to function appropriately within their physical environment, such systems are unsuitable.

More recently, augmented and mixed reality systems have been developed, wherein an image of a real world object can be captured, rendered and placed within a 3D virtual reality environment, such that it can be viewed and manipulated within that environment in the same way as virtual objects therein. Other so-called augmented reality systems exist, comprising a headset having a transparent or translucent visor which, when placed over a user's eyes, creates a three-dimensional environment with which the user can interact, whilst still being able to view their real environment through the visor.

However, in an augmented reality environment, whereby the user can "see" all aspects of their real world environment through the visor as well as the multiple sources of data in the virtual environment, the resultant 3D environment becomes excessively cluttered and it becomes difficult for a user to focus on the important elements thereof. Furthermore, this does not address the problem outlined above, whereby in complex systems, multiple physical controls are provided in fixed locations within the real world environment, which do not enable the user to interact with them conveniently or intuitively.

It is therefore an object of aspects of the present invention to address at least some of these issues.

SUMMARY OF THE INVENTION

In accordance with a first aspect of the present invention, there is provided a mixed reality control apparatus for a system comprising at least one remote data source requiring at least one physical control input, the apparatus comprising a headset for placing over a user's eyes, in use, said headset including a screen, the apparatus further comprising a processor configured to receive data from said at least one remote data source and display said data on said screen within a three-dimensional virtual environment, and image capture means for capturing images of the real world environment in the vicinity of the user, the processor being further configured to:

blend at least portions or objects of said images of said real world environment into said three-dimensional virtual environment to create a mixed reality environment, including said data, to be displayed on said screen; and generate a virtual representation of said at least one physical control input and blend said virtual representation into said mixed reality environment at a selected location, and generate a marker representative of said selected location;

wherein the apparatus is configured to receive a user input in association with said marker, identify said user input as an action in respect of said control input, or said virtual representation thereof, and generate a control signal to effect said action accordingly.

The apparatus may comprise a pair of spatially separated image capture devices for capturing respective images of the real world environment in the vicinity of the user, said processor being configured to define a depth map using respective image frame pairs to produce three-dimensional image data. The image capture devices may be mounted on said headset so as to be substantially aligned with a user's eyes, in use.

The user input may comprise a predefined bodily movement by said user in association with said marker, and said processor is configured to identify a bodily movement, determine from the relative location of said bodily movement in relation to said marker the control input to which said user input relates, determined from said bodily movement the control action required to be performed and generate a control signal to effect said action accordingly. The predefined bodily movement may be a predefined user hand gesture.

As such, the apparatus may further comprise a database in which is stored data representative of a predefined set of bodily movements and control actions to which they relate, and said processor is configured to extract an image of a user's bodily movement from said captured images, compare said movement with said predefined set of bodily movements to determine a match and, thereby, to identify a required control action, and generate a control single operative to cause a required control action to be performed in relation to data displayed within said mixed reality environment.

The processor may be configured to determine, from said images of said real world captured by said image capture means, the direction of a user's gaze, and affix an associated said marker thereto, such that said virtual representation of said control input remains constantly within said user's field of view.

In another exemplary embodiment of the invention, the marker may be in a fixed relative location within said three-dimensional virtual environment displayed on said screen.

In yet another exemplary embodiment, the marker may be associated with a user's body part, and the processor is configured to track movement of said user's body part and adjust the relative location of said virtual representation of said control input accordingly.

The virtual representation of said control input may comprise an image of a corresponding physical control device, and said user input comprises a physical action representative of physical manipulation of said physical control device.

The apparatus may be configured to selectively move said data and/or said virtual representation of said control input and associated marker in response to a user input.

BRIEF DESCRIPTION OF THE DRAWINGS

These and other aspects of the present invention will become apparent from the following specific description of embodiments of the present invention, which are described by way of examples only and with reference to the accompanying drawings, in which.

DETAILED DESCRIPTION

Figure 1:
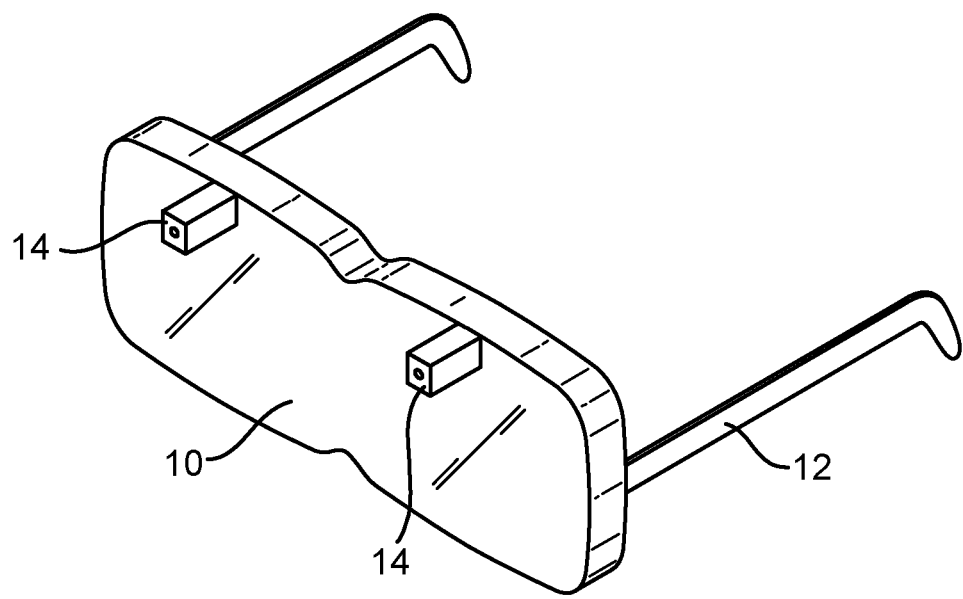
FIG. 1 is a front perspective view of a headset for use in a control apparatus according to an exemplary embodiment of the present invention.

Referring to FIG. 1 of the drawings, a system according to an exemplary embodiment of the present invention may comprise a headset comprising a visor 10 having a pair of arms 12 hingedly attached at opposing sides thereof in order to allow the visor to be secured onto a user's head, over their eyes, in use, by placing the curved ends of the arms 12 over and behind the user's ears, in a manner similar to conventional spectacles. It will be appreciated that, whilst the headset is illustrated herein in the form of a visor, it may alternatively comprise a helmet for placing over a user's head, or even a pair of contact lenses or the like, for placing within the user's eyes, and the present invention is not intended to be in any way limited in this regard. Also provided on the headset, is a pair of image capture devices 14 for capturing images of the environment, such image capture devices being mounted roughly aligned with a user's eyes in use.

The system of the present invention further comprises a processor which is communicably connected in some way to a screen which is provided inside the visor 10. Such communicable connection may be a hard wired electrical connection, in which case the processor and associated circuitry will also be mounted on the headset. However, in an alternative exemplary embodiment, the processor may be configured to wirelessly communicate with the visor, for example, by means of Bluetooth or similar wireless communication protocol, in which case the processor need not be mounted on the headset but can instead be located remotely from the headset, with the relative allowable distance between them being dictated and limited only by the wireless communication protocol being employed. For example, the processor could be mounted on or formed integrally with the user's clothing, or instead located remotely from the user, either as a stand-alone unit or as an integral part of a larger control unit, for example.

Figure 2:
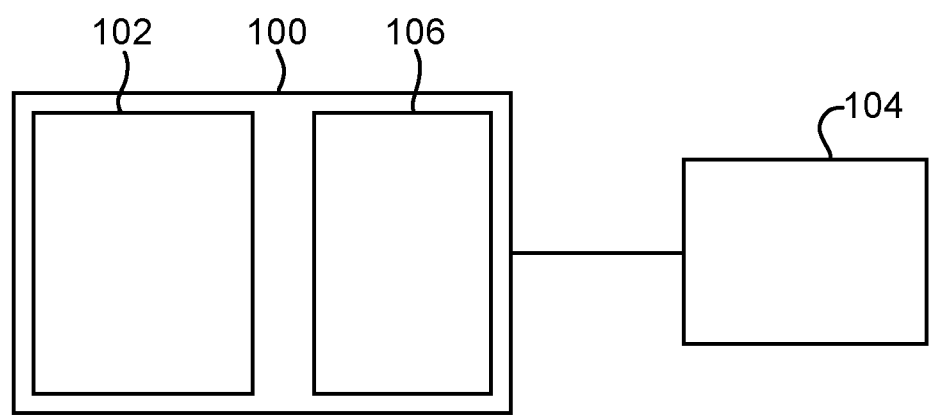
FIG. 2 is a schematic block diagram of a control apparatus according to an exemplary embodiment of the present invention.

Referring to FIG. 2 of the drawings, a system according to an exemplary embodiment of the invention comprises, generally, a headset 100, incorporating a screen 102, a processor 104, and a pair of external digital image capture devices (only one shown) 106.

Figure 3:
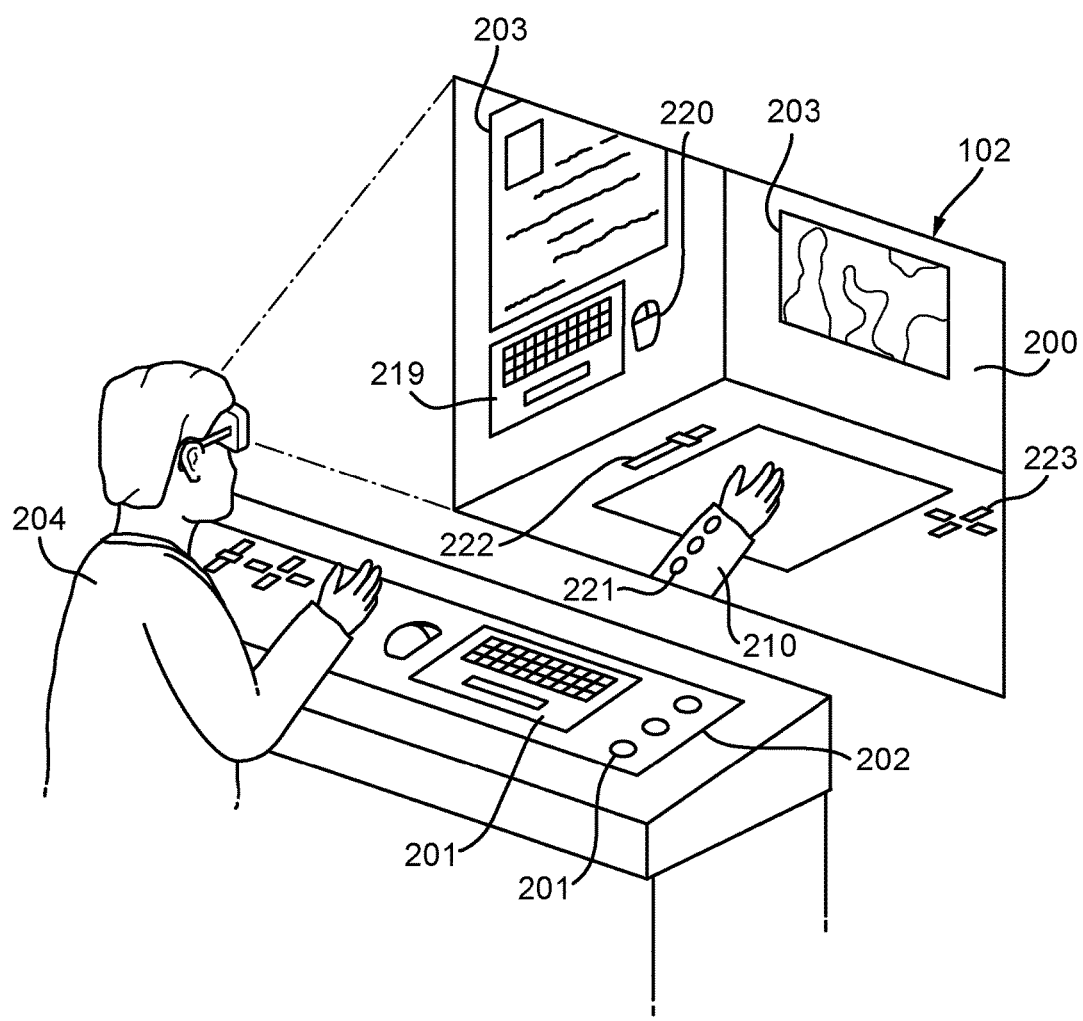
FIG. 3 is a schematic diagram illustrating a system according to an exemplary embodiment of the present invention, in use.

Referring additionally to FIG. 3 of the drawings, a complex control system may require the use of multiple data sources, such as maps, communication feeds, radar displays, etc, as well as a number of physical controls 201 in order to effect control functions and interact with the data. The processor 104 is configured to receive data from multiple sources and display them within the three-dimensional virtual environment 206 displayed on their screen. In the example illustrated, the data sources are displayed as "screens" 203 anchored to 'surfaces' within the three-dimensional virtual environment, but the user 204 is able to move the data sources to any convenient location within the three-dimensional environment 200 and, indeed, the manner in which the data sources themselves are displayed may take any convenient form and the present invention is not necessarily intended to be limited in this regard. Thus, the user can configure these data items within the display environment in any way they wish to, simply by means of hand gestures, for example, as will be described later.

As illustrated in FIG. 3 of the drawings, a complex control system also requires the use of physical hardware, illustrated in the form of a control panel 202, including control elements 201 such as slide switches, buttons, a keyboard and computer mouse, a joystick or lever etc. In the example shown, the physical hardware is illustrated as being located in the same general area, i.e. the control panel 202, within the user's real world environment. However, this may not be the case, and the physical hardware may alternatively be separately located in various places around the operational area.

The user's headset 100 includes two image capture devices, as stated previously, which may be used to capture respective images of the real world environment in the vicinity of the user, and data representative thereof can be blended to produce a stereoscopic depth map which enables the processor to determine depth within the captured images without any additional infrastructure being required.

All or selected portions of the 3D images can be blended into the virtual environment 200 being displayed on the screen. Thus, in the example shown on the screen, only the user's own body 210 is selected for inclusion in the displayed environment, with all other data and images therein being virtual images. However, in an alternative embodiment of the invention, the data displayed may actually be derived from real world captured images of the physical hardware on which it is conventionally displayed, i.e. a computer screen or the like and, thus, the 3D mixed reality environment displayed on the user's screen may, in fact, mirror much more closely their real world environment. Either way, the user is able to change the format and location of any element of the mixed reality environment, in order to "build" their virtual environment as required.

The general concept of real time image blending for augmented and mixed reality is known, and several techniques have been proposed. The present invention is not intended to be in any way limited in this regard. However, for completeness, one exemplary method for image blending will be briefly described. Thus, once the image data for an item to be blended into the virtual environment has been generated, a threshold function may be applied in order to extract that image data from any background images. Its relative location and orientation may also be extracted and preserved by means of marker data. Next, the image and marker data is converted to a binary image, possibly by means of adaptive thresholding (although other methods are known). The marker data and binary image are then transformed into a set of coordinates which match the location within the virtual environment in which they will be blended. Such blending is usually performed using black and white image data. Thus, if necessary, colour data sampled from the source image may be backward warped, using homography, to each pixel in the resultant virtual scene. All of these computational steps require minimal processing capacity and time and can, therefore, be performed quickly and in real time. Thus, if the selected object is moving, for example, the user's own body, the corresponding image data within the virtual environment can be updated in real time.

Also included within the mixed reality environment, are visual representations of the physical control elements required to control and manipulate various aspects of the overall system. In the example shown, a keyboard 219 and mouse 220 are represented in one part of the virtual environment, near a first screen 203, a set of buttons 221 is provided on the user's arm 210, and slide switch 222 and directional buttons 223 are provided in another part of the virtual environment, near another screen 203. In this example, the control elements 219, 220, 221, 222 and 223 are represented in the same manner as their physical counterparts on the control panel 202. Indeed, the images thereof may have been extracted from images captured by the image capture devices on the user's headset and blended into the 3D virtual environment in the manner described above, but this may not necessarily be the case, and they may be represented and/or changed in any manner convenient to the user. Equally, the user can move the virtual control elements within the displayed virtual environment and place and anchor them at any location therein that they wish to. Such rearrangement of the virtual control elements can, once again, be effected by, for example, hand gestures.

As explained above, the image capturing module provided in the system described above can be used to capture video images of the user's hands, such that hand gestures provide a convenient method of manipulating objects and data within the 3D virtual environment. One relatively simple method of automated hand gesture recognition and control using captured digital video images involves the use of a database of images of predefined hand gestures and the command to which they relate. Thus, an auto threshold function is first performed on the image to extract the hand from the background. The wrist is then removed from the hand shape, using a so-called "blob" image superposed over the palm of the hand, to separate out the individual parts of the hand so that the edge of the blob defines the border of the image. The parts outside of the border (i.e. the wrist) are then removed from the image, following which shape recognition software can be used to extract and match the shape of the hand to the predefined hand gesture, and call the associated command accordingly.

It will be appreciated by a person skilled in the art that other methods of manipulating objects within the 3D virtual environment may alternatively or additionally be employed, including other bodily movements, such as a user's head movement, and the present invention is not necessarily intended to be limited in this regard.

Of course, if the user wishes to interact with one of the virtual control elements 219, 220, 221, 222, 223, it will be necessary to perform some form of direction and orientation sensing, such that it can be determined where in the virtual environment the user is performing a predefined hand gesture and, therefore, which element of the environment they wish to manipulate thereby. This can be done by any known means, for example, by image recognition within the captured images of the user's hands relative to a marker within the image, or by means of an accelerometer or similar orientation sensor mounted or otherwise provided on the user's hands. When the user configures their 3D virtual environment to include representations of the physical control elements and places or anchors them therein, a marker is generated which is representative of the respective relative location within the environment of the virtual control element. Thus, if the relative location of the virtual control element is known, the location of the user's hand is known, and the hand gesture made by the user in respect thereof is known, the system is able to determine the control action required to be effected and generate the associated control signals accordingly.

Data and virtual controls can thus be displayed anywhere in the user's extended field of view (defined by the three-dimensional virtual environment displayed on the screen), and can be:

- anchored (by its associated marker) to their gaze (i.e. always in view);
- anchored to the three dimensional virtual space (or a virtual structure or objects therein, i.e. remains in the same relative position within the virtual environment displayed on the screen;
- anchored to the user's body (for example, a screen could be anchored to the inside of a user's wrist, top of their legs, etc)
- anchored to a symbol or marker within the virtual environment (for example, to a QR code on a virtual table or within the pages of a virtual book).

Thus, exemplary embodiments of the present invention provide a mixed reality control apparatus particularly, but not necessarily exclusively, suited for use with a complex system comprised of multiple data sources which are traditionally manipulated using a combination of physical hardware and graphics represented on a two-dimensional screen.

Using the unique functionality described above, user controls can be represented by the creation and insertion of virtual interactive objects, together with associated markers, into a mixed reality environment. The headset mounted cameras capture images of the user's own body, including their arms, hands and fingers and, using the stereo cameras described above, the position of the user's finger tips in three-dimensional space can be inferred, thereby enabling the above-mentioned interaction by the user with virtual elements within their field of view (on the screen). Data can be visualised in three dimensions and, since the design of the user controls is not constrained by physical placement, design or complexity, such virtual representations thereof can be made to appear in a much more intuitive configuration, for ease of user interaction therewith.

Data and virtual controls can be displayed anywhere in the user's extended field of view, as stated above, and virtual data/images can be added, re-sized, relocated or removed using, for example, hand gestures. As a result, traditional 2D displays and controls can be almost entirely eliminated, in some cases, and recreated using the mixed reality control apparatus proposed by aspects of the present invention.

It will be appreciated by a person skilled in the art, from the foregoing description, that modifications and variations can be made to the described embodiments, without departing from the scope of the invention as claimed.

What is claimed is:

1. A mixed reality control apparatus for a system comprising at least one remote data source requiring at least one physical control input, the apparatus comprising a headset for placing over a user's eyes, in use, said headset including a screen, the apparatus further comprising a processor configured to receive data from said at least one remote data source and display said data on said screen within a three-dimensional virtual environment, and at least one image capture device for capturing images of the real world environment in the vicinity of the user, the processor being further configured to:
   blend at least portions or objects of said images of said real world environment into said three-dimensional virtual environment to create a mixed reality environment, including said data, to be displayed on said screen; and
   generate a virtual representation of said at least one physical control input and blend said virtual representation into said mixed reality environment at a selected location, and generate a marker representative of said selected location;
   wherein the apparatus is configured to receive a user input in association with said marker, identify said user input as an action in respect of said control input, or said virtual representation thereof, and generate a control signal to effect said action accordingly, and
   wherein said user input comprises a predefined bodily movement by said user in association with said marker, and said processor is configured to identify a bodily movement, determine from the relative location of said bodily movement in relation to said marker the control input to which said user input relates, determined from said bodily movement the control action required to be performed and generate a control signal to effect said action accordingly.

2. The apparatus according to claim 1, comprising a pair of spatially separated image capture devices for capturing respective images of the real world environment in the vicinity of the user, said processor being configured to define a depth map using respective image frame pairs to produce three-dimensional image data.

3. The apparatus according to claim 2, wherein said image capture devices are mounted on said headset so as to be substantially aligned with a user's eyes, in use.

4. The apparatus according to claim 2, wherein said predefined bodily movement is a predefined user hand gesture.

5. The apparatus according to claim 2, further comprising a database in which is stored data representative of a predefined set of bodily movements and control actions to which they relate, and said processor is configured to extract an image of a user's bodily movement from said captured images, compare said movement with said predefined set of bodily movements to determine a match and, thereby, to identify a required control action, and generate a control single operative to cause a required control action to be performed in relation to data displayed within said mixed reality environment.

6. The apparatus according claim 1, wherein said marker is in a fixed relative location within said three-dimensional virtual environment displayed on said screen.

7. The apparatus according to claim 1, wherein said marker is associated with a user's body part, and the processor is configured to track movement of said user's body part and adjust the relative location of said virtual representation of said control input accordingly.

8. The apparatus according to claim 1, wherein said virtual representation of said control input comprises an image of a corresponding physical control device, and said user input comprises a physical action representative of physical manipulation of said physical control device.

9. The apparatus according to claim 1, configured to selectively move said data and/or said virtual representation of said control input and associated marker in response to a user input.

10. A mixed reality control apparatus for a system comprising at least one remote data source requiring at least one physical control input, the apparatus comprising a headset for placing over a user's eyes, in use, said headset including a screen, the apparatus further comprising a processor configured to receive data from said at least one remote data source and display said data on said screen within a three-dimensional virtual environment, and at least one image capture device for capturing images of the real world environment in the vicinity of the user, the processor being further configured to:
   blend at least portions or objects of said images of said real world environment into said three-dimensional virtual environment to create a mixed reality environment, including said data, to be displayed on said screen; and
   generate a virtual representation of said at least one physical control input and blend said virtual representation into said mixed reality environment at a selected location, and generate a marker representative of said selected location;
   wherein the apparatus is configured to receive a user input in association with said marker, identify said user input as an action in respect of said control input, or said virtual representation thereof, and generate a control signal to effect said action accordingly, and
   wherein said processor is configured to determine, from said images of said real world captured by said at least one image capture device, the direction of a user's gaze, and affix an associated said marker thereto, such that said virtual representation of said control input remains constantly within said user's field of view.

* * * * *